(12) United States Patent
Achiwa

(10) Patent No.: US 12,307,796 B2
(45) Date of Patent: May 20, 2025

(54) IMAGE PROCESSING APPARATUS CAPABLE OF RESTORING DEGRADED IMAGE WITH HIGH ACCURACY, IMAGE PROCESSING METHOD, AND STORAGE MEDIUM

(71) Applicant: CANON KABUSHIKI KAISHA, Tokyo (JP)

(72) Inventor: Ken Achiwa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 406 days.

(21) Appl. No.: 17/529,672

(22) Filed: Nov. 18, 2021

(65) Prior Publication Data
US 2022/0180114 A1 Jun. 9, 2022

(30) Foreign Application Priority Data
Dec. 8, 2020 (JP) .................. 2020-203561

(51) Int. Cl.
*G06V 30/148* (2022.01)
*G06N 20/00* (2019.01)
(Continued)

(52) U.S. Cl.
CPC .......... *G06V 30/153* (2022.01); *G06N 20/00* (2019.01); *G06T 5/00* (2013.01); *G06V 30/133* (2022.01);
(Continued)

(58) Field of Classification Search
CPC .. G06V 30/153; G06V 30/133; G06V 30/164; G06V 30/19167; G06V 30/412;
(Continued)

(56) References Cited

U.S. PATENT DOCUMENTS
2021/0097271 A1* 4/2021 Kim ................ G06V 30/36

FOREIGN PATENT DOCUMENTS
JP 2019169025 A * 10/2019

OTHER PUBLICATIONS

"Christian Reul et. al., State of the Art Optical Character Recognition of 19th Century Fraktur Scripts using Open Source Engines, Oct. 2018, Computer Vision and Pattern Recognition, Computer Science, Cornell University arXiv" (Year: 2018).*
(Continued)

*Primary Examiner* — Andrae S Allison
*Assistant Examiner* — Phuong Hau Cai
(74) *Attorney, Agent, or Firm* — ROSSI, KIMMS & McDOWELL LLP

(57) ABSTRACT

An image processing apparatus that is capable of restoring a degraded image with high accuracy The image processing apparatus acquires image data including an image of character information and identifies a character type of the character information. A learned model adapted to the identified character type is acquired from a plurality of learned models subjected to machine learning using images for learning, which are associated with a plurality of character type conditions, respectively, and correct answer images associated therewith. The image of character information is input to the acquired learned model to restore the image of character information.

10 Claims, 15 Drawing Sheets

(51) Int. Cl.
  *G06T 5/00* (2024.01)
  *G06V 30/12* (2022.01)
  *G06V 30/164* (2022.01)
  *G06V 30/19* (2022.01)

(52) U.S. Cl.
  CPC ...... *G06V 30/164* (2022.01); *G06V 30/19167* (2022.01)

(58) Field of Classification Search
  CPC ........ G06N 20/00; G06N 3/045; G06N 3/084; G06T 5/00
  See application file for complete search history.

(56) References Cited

OTHER PUBLICATIONS

"V. Bharath et. al., A Font Style Classification System for English OCR, Jun. 2017, 2017 International Conference on Intelligent Computing and Control, IEEE" (Year: 2017).*

"Yogomaya Mohapatra et. al., Spell Checker for OCR, 2013, International Journal of Computer Science and Information Technologies, vol. 4[1], pp. 91-97" (Year: 2013).*

"N. Shobha Rani et al., Deformed Character Recognition Using Convolutional Neural Networks, 2018, International Journal of Engineering & Technology, 7 [3], pp. 1599-1604" (Year: 2018).*

* cited by examiner

*FIG. 7A*

| | SAMPLE 1 | | SAMPLE 2 | |
|---|---|---|---|---|
| | INPUT IMAGE | CORRECT ANSWER IMAGE | INPUT IMAGE | CORRECT ANSWER IMAGE |
| IMAGE | 電 | 電 | 驚 | 驚 |

*FIG. 7B*

| | SAMPLE 1 | | SAMPLE 2 | |
|---|---|---|---|---|
| | DEGRADED IMAGE | RESTORED IMAGE | DEGRADED IMAGE | RESTORED IMAGE |
| IMAGE | 源 | 源 | D | D |
| CHARACTER INFORMATION | 瀧 | 源 | O | D |

FIG. 8

| | | | 発行日： | 2020年5月16日 |
|---|---|---|---|---|

注文書

| □□株式会社 | 御中 |
|---|---|

下記の通り注文いたします。

○○株式会社

〒180-0011
東京都渋谷区△△△

| TEL： | 03-0123-4567 |
|---|---|

注文書番号： 00012054

| コード | 商品名 | 数量 | 単価 | 金額 |
|---|---|---|---|---|
| 2032 | 部品A | 200 | ¥480 | ¥90,000 |
| 5521 | 部品B | 20 | ¥120 | ¥2,400 |
| 3294 | 部品C | 30 | ¥180 | ¥4,800 |
| | | | | |
| | | | | |
| | | | 合計 | ¥96,900 |

*FIG. 9A*

| DEGRADED IMAGE | RESTORED IMAGE | CORRECT ANSWER IMAGE |
|---|---|---|
| FIG3 | FI63 | FIG3 |

*FIG. 9B*

| DEGRADED IMAGE | RESTORED IMAGE | CORRECT ANSWER IMAGE |
|---|---|---|
| 482101 | 482404 | 482404 |

MISSING

IMAGE PROCESSING APPARATUS CAPABLE OF RESTORING DEGRADED IMAGE WITH HIGH ACCURACY, IMAGE PROCESSING METHOD, AND STORAGE MEDIUM

BACKGROUND OF THE INVENTION

Field of the Invention

The present invention relates to an image processing apparatus that is capable of restoring a degraded image with high accuracy, an image processing method, and a storage medium.

Description of the Related Art

Conventionally, for an image including character information, there is used a technique for performing optical character recognition (OCR) processing to extract the character information. As a related art, there has been proposed a technique in Japanese Laid-Open Patent Publication (Kokai) No. 2019-169025. The technique disclosed in Japanese Laid-Open Patent Publication (Kokai) No. 2019-169025 retrieves similar business form data using features of a business form to be processed and processes the business form to be processed using an OCR engine associated with the retrieved business form data, which is selected from a plurality of OCR engines. With this, an optimum OCR engine is selected for each business form data or item to be processed.

An image is degraded when ready by a scanner, when transmitted by facsimile, or when subjected to similar processing. Even when OCR processing is performed on such a degraded image, character information cannot be always extracted with high accuracy, and can be erroneously recognized. For example, a lot of characters similar in shape exist in character information included in an image to be subjected to OCR. If an image to be subjected to OCR is degraded, missing, deformation, or the like occurs in character information included in the image. For this reason, in a case where the OCR processing is performed on the degraded image, there is an increased possibility of erroneous recognition of characters similar in shape. Although the technique disclosed in Japanese Laid-Open Patent Publication (Kokai) No. 2019-169025 selects an optimum OCR engine for each business form or each item to be processed, it is difficult to recognize character information in which missing, deformation, or the like has occurred, with high accuracy.

SUMMARY OF THE INVENTION

The present invention provides an image processing apparatus that is capable of restoring a degraded image with high accuracy, an image processing method, and a storage medium.

In a first aspect of the present invention, there is provided an image processing apparatus, including at least one processor, and a memory coupled to the at least one processor, the memory having instructions, wherein the at least one processor executes the instructions to perform acquiring image data including an image of character information, identifying a character type of the character information, acquiring a learned model adapted to the identified character type from a plurality of learned models subjected to machine learning using images for learning, which are associated with a plurality of character type conditions, respectively, and correct answer images associated therewith, and inputting the image of character information to the acquired learned model to restore the image of character information.

In a second aspect of the present invention, there is provided an image processing method, including acquiring image data including an image of character information, identifying a character type of the character information, acquiring a learned model adapted to the identified character type from a plurality of learned models subjected to machine learning using images for learning, which are associated with a plurality of character type conditions, respectively, and correct answer images associated therewith, and inputting the image of character information to the acquired learned model to restore the image of character information.

According to the present invention, it is possible to restore a degraded image with high accuracy.

Further features of the present invention will become apparent from the following description of exemplary embodiments (with reference to the attached drawings).

BRIEF DESCRIPTION OF THE DRAWINGS

FIGS. 7A and 7B are diagrams showing samples useful in explaining the learning process and an inference process.

FIG. 8 is a view showing an example of an image of a business form.

FIGS. 9A to 9C are diagrams each showing respective examples of a degraded image, a restored image, and a correct answer image.

DESCRIPTION OF THE EMBODIMENTS

The present invention will now be described in detail below with reference to the accompanying drawings showing embodiments thereof. However, the configurations of the following embodiments are described only by way of example, and are by no means intended to limit the scope of the present invention.

Figure 1:
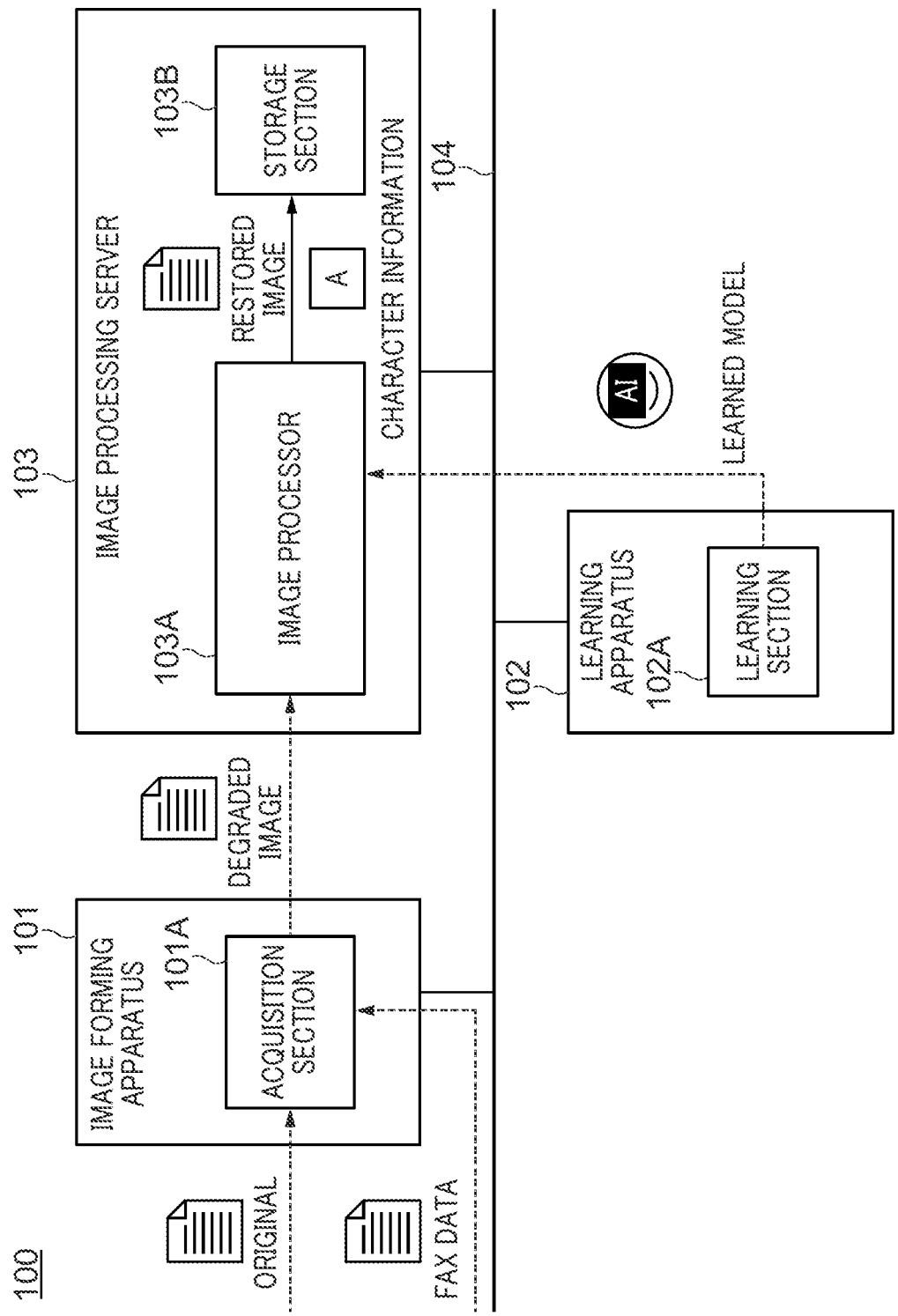
FIG. 1 is a diagram showing an example of an image processing system.

FIG. 1 is a diagram showing an example of an image processing system 100. The image processing system 100 includes an image forming apparatus 101, a learning apparatus 102, and an image processing server 103. The image forming apparatus 101, the learning apparatus 102, and the image processing server 103 are interconnected by a network 104. The network 104 is e.g. a LAN or a WAN. The network 104 may be a network that performs wired communication or wireless communication. The image forming apparatus 101, the learning apparatus 102, and the image processing server 103 may be configured, not as separate apparatuses, but as an integrated apparatus. Further, each apparatus may be formed by a single apparatus or by separate apparatuses. For example, the image processing server 103 may include a first server apparatus having a resource for high-speed computation and a second server apparatus having a large-capacity storage, which are connected to each other.

The image forming apparatus 101 is an apparatus, such as a multi-function peripheral (MFP), that realizes a plurality of functions, such as print, scan, and FAX functions. The image forming apparatus 101 has a function of an acquisition section 101A for acquiring image data. Note that in the following description, image data in the embodiments is document image data (original data) including an image of character information. For example, the image forming apparatus 101 acquires image data by scanning an original, such as a business form, printed on a paper medium. Further, for example, the image forming apparatus 101 acquires image data (FAX data) by receiving an original, such as a business form, transmitted by a facsimile apparatus, and performing predetermined FAX processing on the received FAX data. The image forming apparatus 101 transmits the acquired image data to the image processing server 103. Here, the image data acquired by the image forming apparatus 101 is a degraded image which is degraded in image quality from the original image data. For example, the degraded image is image data on which image compression, such as JPEG, or irreversible conversion, such as resolution conversion and binarization, has been performed. By using the degraded image, it is possible to reduce the amount of data.

The learning apparatus 102 performs machine learning of a learning model. The learning apparatus 102 includes a learning section 102A that performs machine learning. When a degraded image is input to a learning model, the learning apparatus 102 performs machine learning of the learning model so as to output a restored image close to an original image before being subjected to irreversible conversion, such as compression noise removal, resolution enhancement, and gradation increase. The following description is given assuming that machine learning of the present embodiment is deep learning for a neural network having a multi-layered structure. However, as the machine learning method, a desired machine learning algorithm of a support vector machine, a decision tree, or the like may be applied.

An original image is image data having high image quality before being subjected to irreversible conversion by scan or FAX processing. In the present embodiment, the description is given assuming that an original to be scanned or an original to be transmitted by FAX is a business form. However, the original to be scanned or the original to be transmitted by FAX may be an original other than a business form. These originals are degraded in image quality during a process of scanning or a process of FAX transmission, and hence missing, deformation, etc., occur in character information included in the original.

The learning apparatus 102 performs machine learning using a learning set including image data for learning and teacher data. The image data for learning is a degraded image, and the teacher data is a correct answer image associated with the degraded image. As the correct answer image, an image before being degraded to the degraded image is used. The learning set is set to the learning apparatus 102 e.g. by an engineer. The learning set used for machine learning preferably includes various types of images for learning and teacher data. Through machine learning of a learning model performed by the learning apparatus 102, weighting parameters of the learning model are updated to generate a machine-learned learning model. In the following description, the machine-learned learning model is referred to as the learned model. The learning apparatus 102 transmits the generated learned model to the image processing server 103.

The image processing server 103 is an image processing apparatus that restores a degraded image received from the image forming apparatus 101 using a learned model received from the learning apparatus 102. The image processing server 103 includes an image processor 103A and a storage section 103B. The image processor 103A inputs a degraded image to the learned model and stores a restored image which is output from the learned model as an inference result, in the storage section 103B. Further, the image processor 103A performs the OCR processing (optical character recognition processing) on the restored image, extracts character information (text data) included in the restored image, and stores the extracted character information in the storage section 103B in association with the restored image.

Figure 2A:
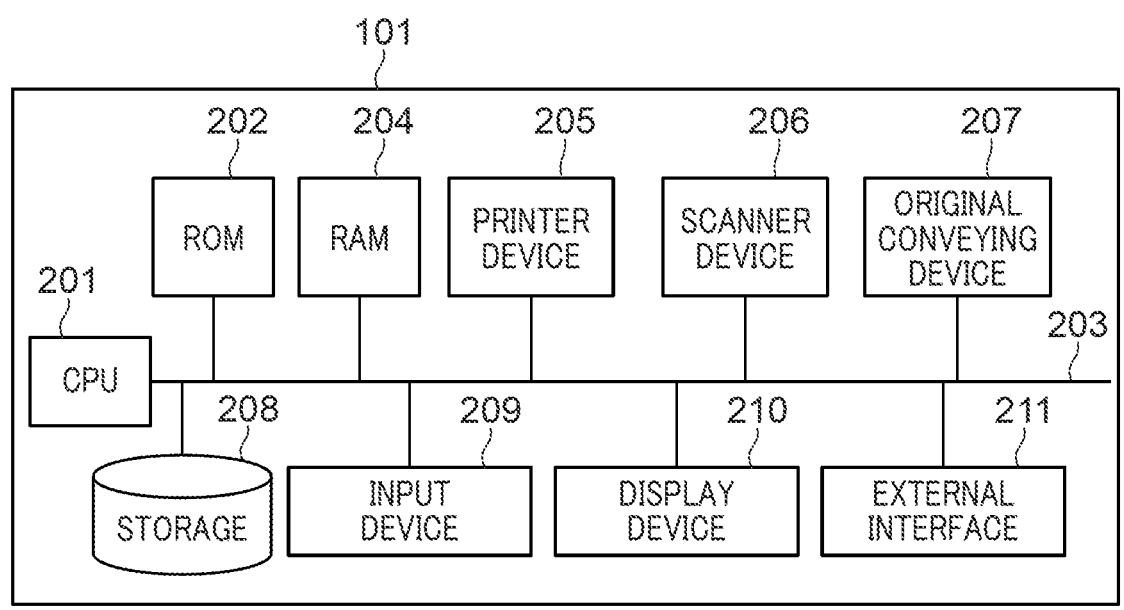
FIGS. 2A to 2C are diagrams showing respective examples of the hardware configurations of apparatuses forming the image processing system, respectively.
Figure 2B:
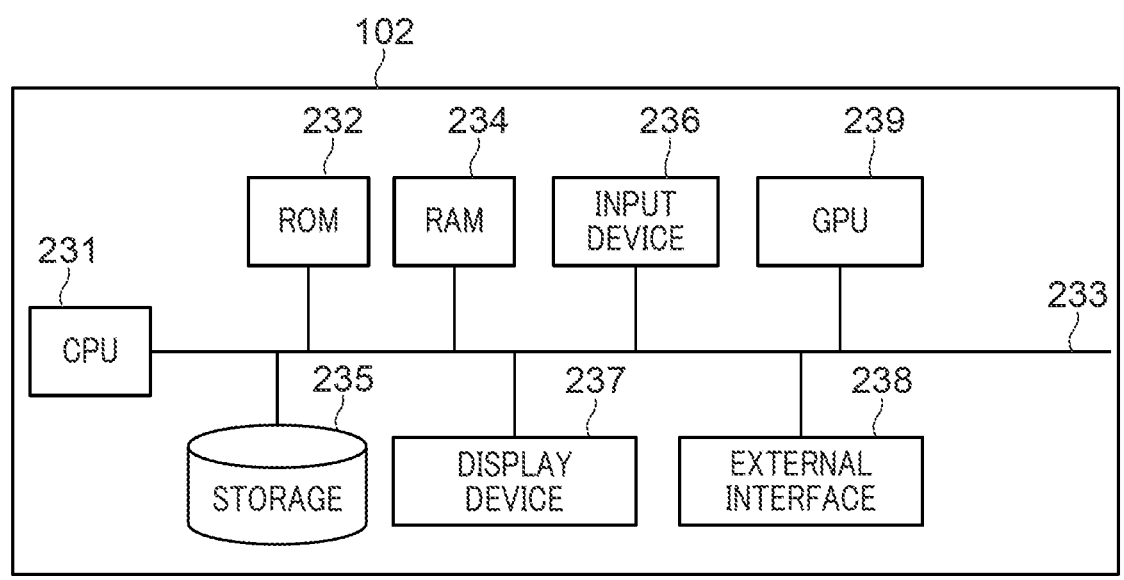
Figure 2C:
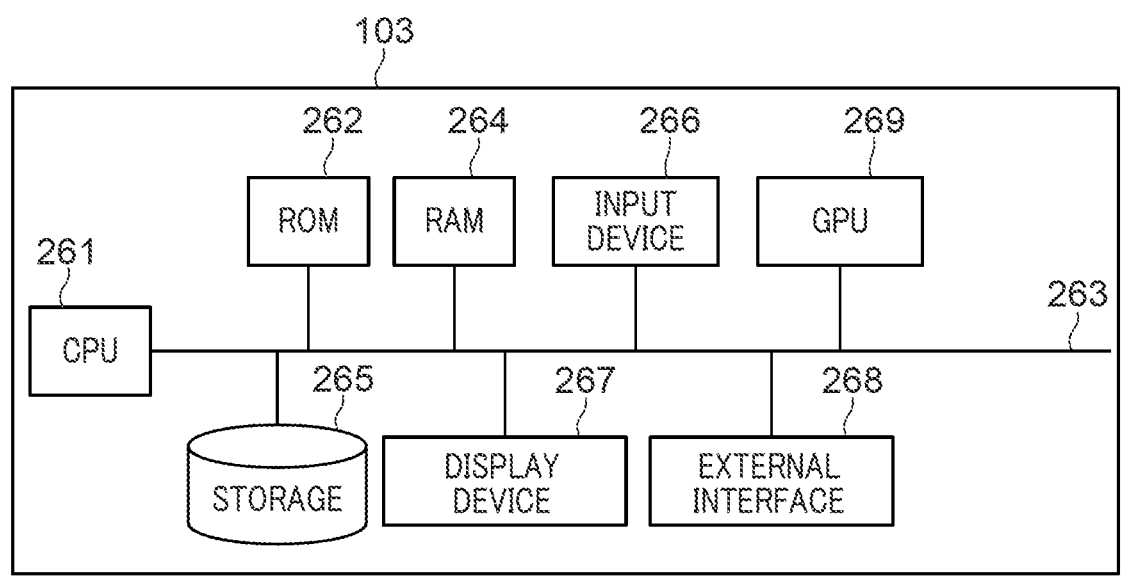

FIGS. 2A to 2C are diagrams showing respective examples of the hardware configurations of the apparatuses. FIG. 2A is a diagram showing an example of the hardware configuration of the image forming apparatus 101. The image forming apparatus 101 includes a CPU 201, a ROM 202, a RAM 204, a printer device 205, a scanner device 206, and an original conveying device 207. Further, the image forming apparatus 101 includes a storage 208, an input device 209, a display device 210, and an external interface 211. These components are interconnected by a data bus 203.

The CPU 201 controls the overall operation of the image forming apparatus 101. The CPU 201 starts the system of the image forming apparatus 101 by executing a boot program stored in the ROM 202. Then, the CPU 201 realizes various control operations for the image forming apparatus 101 by executing control programs stored in the storage 208. The ROM 202 is implemented e.g. by a nonvolatile memory and stores the boot program for starting the image forming apparatus 101. The data bus 203 is used for data communication between the components of the image forming apparatus 101. The RAM 204 is implemented by a volatile memory and is used as a work memory when the CPU 201 executes the control programs.

The printer device 205 is an image output device, which prints image data stored in the image forming apparatus 101 on a recording medium and outputs the printout. The scanner device 206 is an image input device and is an image reading section for optically reading a recording medium on which characters, charts, pictures, and the like have been printed, to acquire read data as image data. The original conveying device 207 is implemented e.g. by an automatic document feeder (ADF). The original conveying device 207 detects originals, such as business forms, placed on a document base, and conveys the detected originals to the scanner device 206, one by one. The storage 208 is e.g. a hard disk drive (HDD) and stores the control programs, image data, and so forth.

The input device 209 is realized e.g. by a touch panel, hard keys, a mouse, a keyboard, etc. When a user performs an operation using the input device 209, the CPU 201 receives the operation. The display device 210 is realized e.g. by a liquid crystal display and displays various screens including a setting screen, under the control of the CPU 201. The external interface 211 connects between the image forming apparatus 101 and the network 104. The external interface 211 receives FAX data from an external FAX apparatus. Further, the external interface 211 transmits image data including a degraded image to the image processing server 103.

FIG. 2B is a diagram showing an example of the hardware configuration of the learning apparatus 102. As shown in FIG. 2B, the learning apparatus 102 includes a CPU 231, a ROM 232, a RAM 234, a storage 235, an input device 236, a display device 237, an external interface 238, and a GPU 239. These components are interconnected by a data bus 233. The CPU 231 controls the overall operation of the learning apparatus 102. The CPU 231 starts the system of the learning apparatus 102 by executing a boot program stored in the ROM 232. Further, the CPU 231 performs control on machine learning of a learning model for performing image restoration by executing a learning program stored in the storage 235. The ROM 232 is realized e.g. by a nonvolatile memory and stores the boot program for starting the learning apparatus 102.

The data bus 233 is used for data communication between the components of the learning apparatus 102. The RAM 234 is implemented by a volatile memory and is used as a work memory when the CPU 231 executes the learning program. The storage 235 is realized e.g. by an HDD and stores the learning program, learning data, and so forth. The input device 236 is implemented by a mouse, a keyboard, and so forth. When an engineer or the like performs an operation using the input device 236, the CPU 231 receives the operation. The display device 237 is implemented e.g. by a liquid crystal display. The display device 237 displays various screens including a setting screen.

The external interface 238 is connected to the network 104. For example, the learning apparatus 102 acquires a learning set used for machine learning of a learning model from an external server or an external terminal (such as a personal computer or an edge computer) via the external interface 238. The graphics processing unit (GPU) 239 is used for computation of machine learning. The GPU 239 performs computation processing on machine learning of a learning model using a learning set under the control of the CPU 231. Machine learning of a learning model may be performed by the GPU 239 or the CPU 231, or may be performed by the cooperative operation of the GPU 239 and the CPU 231. Further, machine learning of a learning model may be realized by a circuit specialized for computation of machine learning.

FIG. 2C is a diagram showing an example of the hardware configuration of the image processing server 103. The image processing server 103 includes a CPU 261, a ROM 262, a RAM 264, a storage 265, an input device 266, a display device 267, an external interface 268, and a GPU 269. These components are interconnected by a data bus 263. The CPU 261 controls the overall operation of the image processing server 103. The CPU 261 corresponds to an acquisition unit and an identification unit. The CPU 261 starts the system of the image processing server 103 by executing a boot program stored in the ROM 262. The CPU 261 executes image processing, such as business form recognition, image restoration, and character information extraction, by executing an image processing program stored in the storage 265. The ROM 262 is implemented e.g. by a nonvolatile memory and stores the boot program for starting the image processing server 103. The data bus 263 is used for data communication between the components of the image processing server 103.

The RAM 264 is implemented by a volatile memory and is used as a work memory when the CPU 261 executes the image processing program. The storage 265 is realized e.g. by an HDD and stores the image processing program, learned models, registered business forms, and so forth. The input device 266 is implemented by a mouse, a keyboard, and so forth. When a user performs an operation using the input device 266, the CPU 261 receives the operation. The display device 267 is realized e.g. by a liquid crystal display and displays various screens including a setting screen. The external interface 268 is connected to the network 104. The image processing server 103 acquires a learned model from the learning apparatus 102 and acquires image data including a degraded image from the image forming apparatus 101 via the external interface 268.

The GPU 269 performs computation for inference under the control of the CPU 261. The GPU 269 or the CPU 261 corresponds to an image processing unit. When the CPU 261 inputs a degraded image to be restored to a learned model, the GPU 269 performs computation on the learned model and outputs a restored image as an inference result. Inference processing may be performed by the GPU 269 or the CPU 261, or may be performed by the cooperative operation of the GPU 269 and the CPU 261. Further, inference processing may be realized by a circuit specialized for computation of machine learning.

Figure 3A:
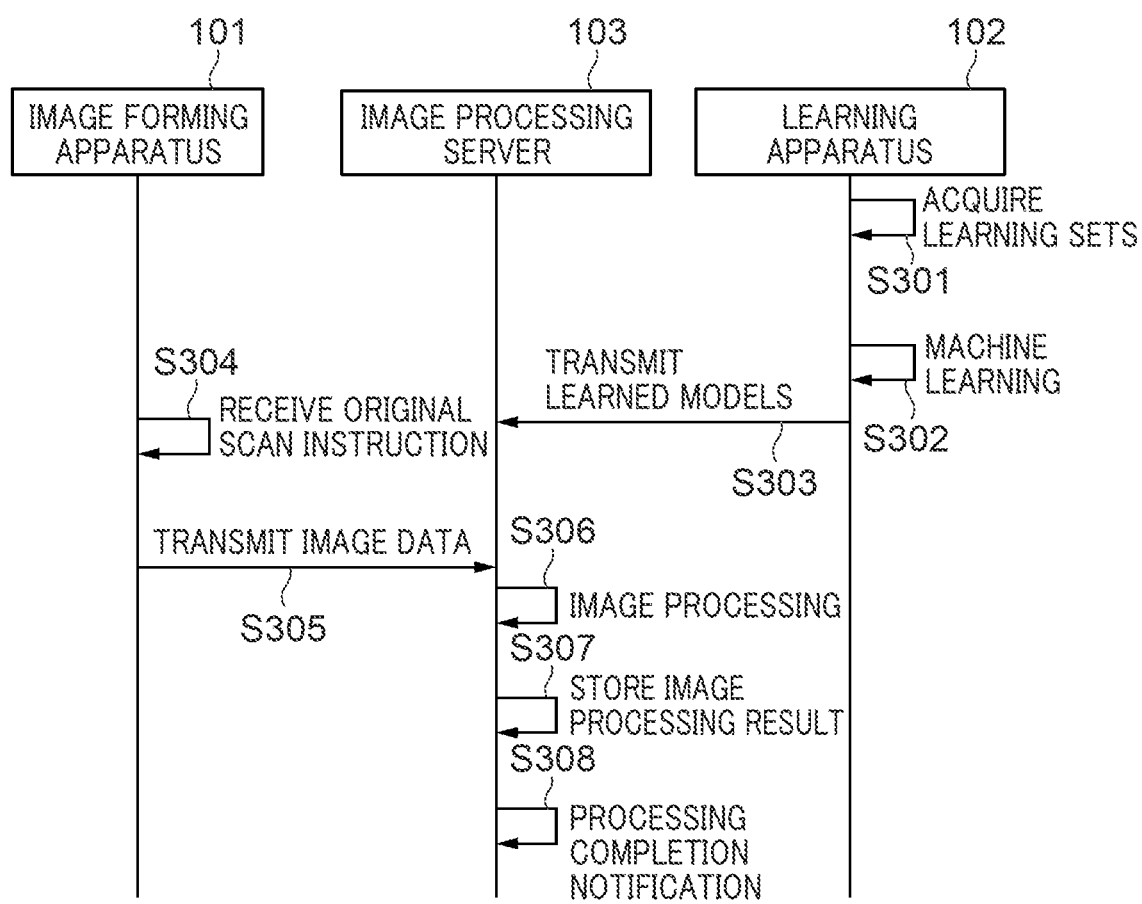
FIGS. 3A and 3B are sequence diagrams each showing an example of a flow of use of the image processing system.
Figure 3B:
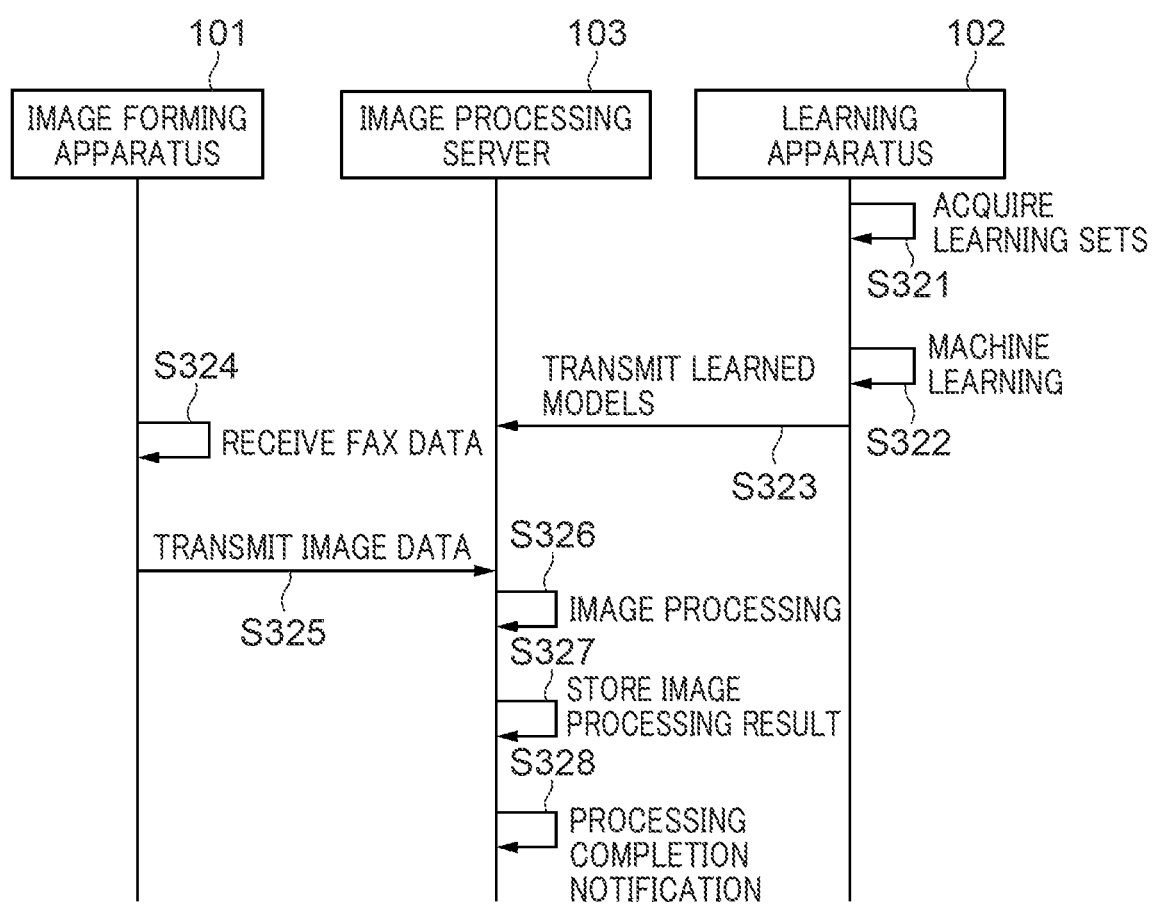

FIGS. 3A and 3B are sequence diagrams each showing an example of a flow of use of the image processing system 100. Although the following description will be given of an example of a case where the image processing system 100 is used for an order reception/placement task, the image processing system 100 can be applied to a system other than the order reception/placement task. In the order reception/placement task, image data of a business form, such as an order placed from an orderer to an order receiver (user), and information (character information) on characters included in the image data are registered in the image processing server 103. The image processing server 103 is also referred to as the business system.

FIG. 3A is a diagram showing a flow of a process performed when an orderer transmits a business form original, such as an order form, to an order receiver by postal mail, and the order receiver subjects the received business form original to scanning and registers the data formed by scanning, in the image processing server 103. In a step S301, the learning apparatus 102 acquires a learning set according to an operation of an engineer. For example, the CPU 231 of the learning apparatus 102 may acquire a learning set by receiving a learning set transmitted by the engineer from his/her terminal. Further, the learning apparatus 102 may acquire a learning set input to the learning apparatus 102 by an input operation performed by the engineer.

In a step S302, the CPU 231 performs machine learning of a learning model using image data (degraded image) for learning as input data and a correct answer image as teacher data, which are included in the learning set. The degraded image is an image subjected to image processing for degrading the correct answer image. As described hereinafter, a learned model is generated for each of a plurality of character type conditions. Therefore, the CPU 231 performs machine learning of a plurality of learning models and generates a plurality of learned models. In a step S303, the CPU 231 transmits the plurality of generated learned models to the image processing server 103. The CPU 261 of the image processing server 103 stores the acquired learned models e.g. in the storage 265. The steps S301 to S303 are a preliminary process before inference is performed.

Processing operations of a step S304 et seq. are a process associated with the order reception/placement task. First, the order receiver receives a business form original sent from the orderer by postal mail. In the step S304, the order receiver instructs the image forming apparatus 101 to scan the business form original. For example, the order receiver sets the business form original on the original conveying device 207 and performs an operation of instructing the image forming apparatus 101 to perform feed scanning of the business form original using the input device 209. The scanner device 206 reads the business form original, and the read business form original is output to the CPU 201 as image data. With this, the CPU 201 acquires the image data of the business form original. The acquired image data of the business form original is data of an image subjected to e.g. irreversible conversion, so that the image data is degraded in image quality. In a step S305, the CPU 201 transmits the image data (degraded image) to the image processing server 103 e.g. in response to an instruction from the order receiver.

In a step S306, the CPU 261 of the image processing server 103 performs control for executing image processing on the degraded image acquired from the image processing apparatus 101. At this time, the CPU 261 performs processing for restoring the acquired degraded image using the learned model stored e.g. in the storage 265 and then performs processing for extracting character information from the restored image. In a step S307, the CPU 261 stores the restored image and the extracted character information in a state associated with each other, as an image processing result, in the storage 265. In a step S308, the CPU 261 notifies the user of completion of the processing. The CPU 261 may display a notification indicating completion of the processing on the display device 237. Alternatively, the CPU 261 may transmit a notification indicating completion of the processing to an e-mail address or a message account associated with the order receiver (user) who logged into the image processing apparatus 101 to instruct scanning of the document in the step S304. With this, the user can recognize completion of the processing associated with the order reception/placement task.

FIG. 3B is a diagram showing a flow of a process performed when an orderer transmits a business form original to the image processing server 103 by FAX transmission using a FAX apparatus, and the received FAX data of the business form original is registered in the image processing server 103. Steps S321 to S323 are the same as the above-described steps S301 to S303, steps S326 to S328 are the same as the above-described steps S306 to S308, and hence description thereof is omitted. In the illustrated example in FIG. 3B, it is assumed that the order receiver has set beforehand reception settings of FAX transmission performed by the orderer using the input device 209 of the image forming apparatus 101.

The orderer transmits a business form original to the image forming apparatus 101 using the FAX apparatus. In a step S324, the external interface 211 of the image forming apparatus 101 receives the FAX data from the FAX apparatus. The image of the received FAX data is a degraded image which is degraded from the image of the business form original. In a step S325, the CPU 201 of the image forming apparatus 101 transmits the image data (degraded image) to the image processing server 103 according to the above-mentioned reception settings. Then, the image processing server 103 executes the steps S326 to S328.

Next, machine learning of a learning model, performed by the learning apparatus 102, will be described. When the learning apparatus 102 performs machine learning of a learning model, a learning set (learning data) is used which is formed by a pair of an image for learning and teacher data (correct answer image). The correct answer image is an original image not degraded in image quality or an image less degraded in image quality. On the other hand, the image for learning is an image formed by degrading the image quality of the correct answer image. The learning set formed by the pair of the correct answer image and the image for learning is used for machine learning of a learning model. The learning apparatus 102 performs machine learning of a learning model using a lot of learning sets to generate a learned model, whereby the learning apparatus 102 can improve the inference accuracy of the learned model.

Figure 4:
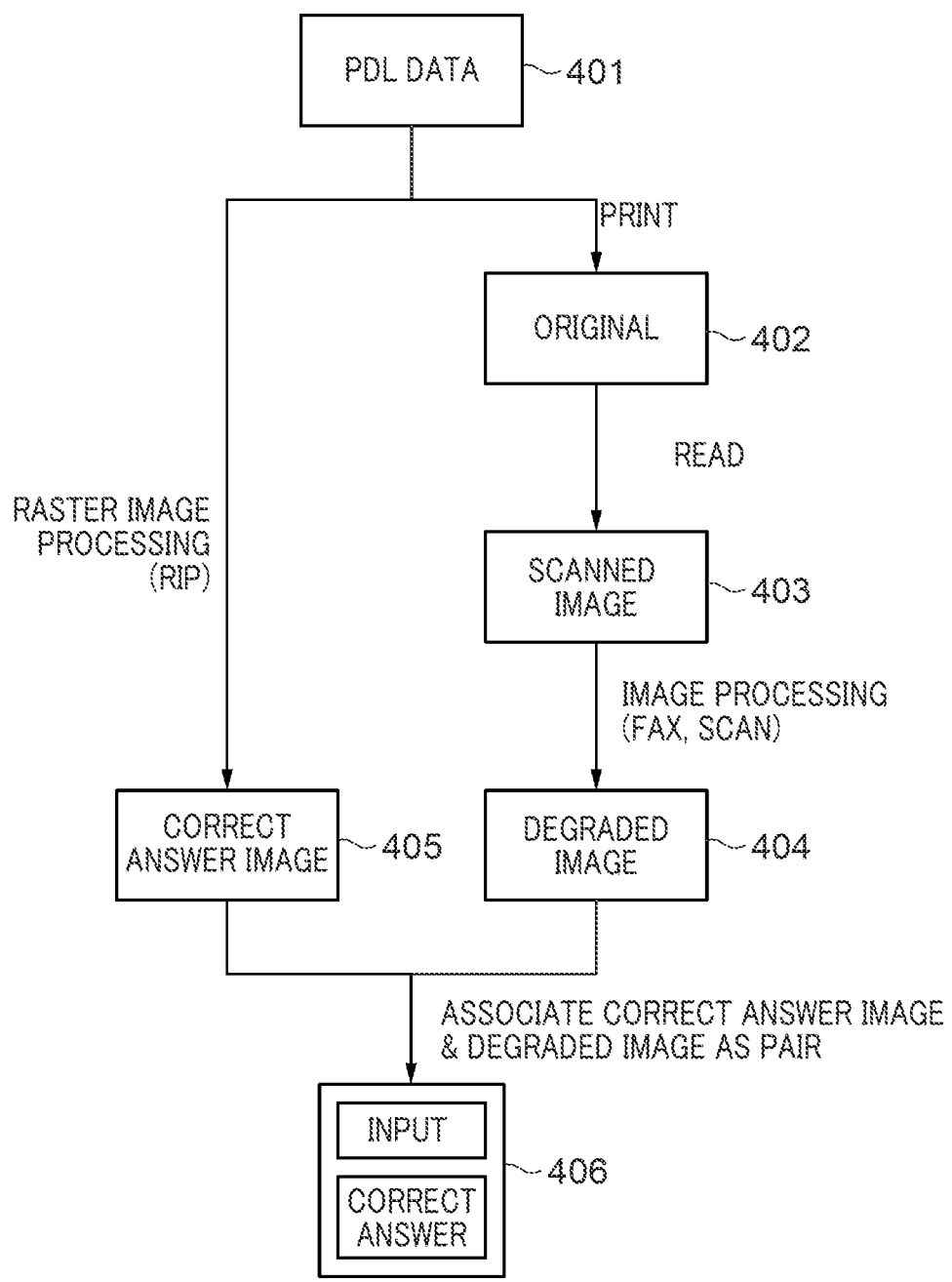
FIG. 4 is a diagram showing an example of generation of a learning set.

FIG. 4 is a diagram showing an example of generation of a learning set. Printer description language (PDL) data 401 is data of a vector format that describes a correct answer image in high quality. The PDL data 401 corresponds to the correct answer image as the teacher data. For example, data in the format of PostScript, Portable Document Format (PDF), or the like may be applied to the PDL data 401. Data in a format different from the PDL may be used for the teacher data. An original 402 is an original generated by printing the PDL data 401 on a sheet. A scanned image 403 is an image generated by reading the printed original 402 using e.g. a scanner device.

A degraded image 404 is an image generated by degrading the scanned image 403 through image processing. As the image processing for generating the degraded image 404, for example, FAX image processing, such as resolution conversion and binarization, can be applied so as to reproduce degradation of an image, caused by FAX transmission/reception. Further, as the image processing for generating the degraded image 404, for example, image correction adapted to characteristics of the scanner device 206 and scanned image processing, such as image compression e.g. using JPEG, can be applied so as to reproduce degradation of an image, caused by scanning.

Generation of the degraded image 404 is performed under an environment in which an engineer performs development using a predetermined apparatus. In doing this, it is preferable that the degraded image 404 generated by the predetermined apparatus used by the engineer has reproductivity equivalent to an image printed and scanned by the printer device 205 and the scanner device 206 of the image forming apparatus 101 so as to improve the inference accuracy of the learned model. Further, the degraded image 404 may be obtained by reading the original 402 printed by the printer device 205 based on the PDL data 401, using the scanner device 206, and performing image processing on the read scanned image 403. Further, the degraded image 404 may be generated by a simulator that artificially simulates the printer device 205 and scanning device 206.

A correct answer image 405 is an image obtained by performing rasterizing (Raster Image Processing: RIP) for converting the printer description language (PDL) data 401 of the vector format to raster format data at a predetermined resolution. The degraded image 404 and the correct answer image 405 are associated as a pair to thereby generate a learning set 406. The method of generating the learning set 406, the apparatus to be used, and so forth are not limited to the above-described examples.

Figure 5:
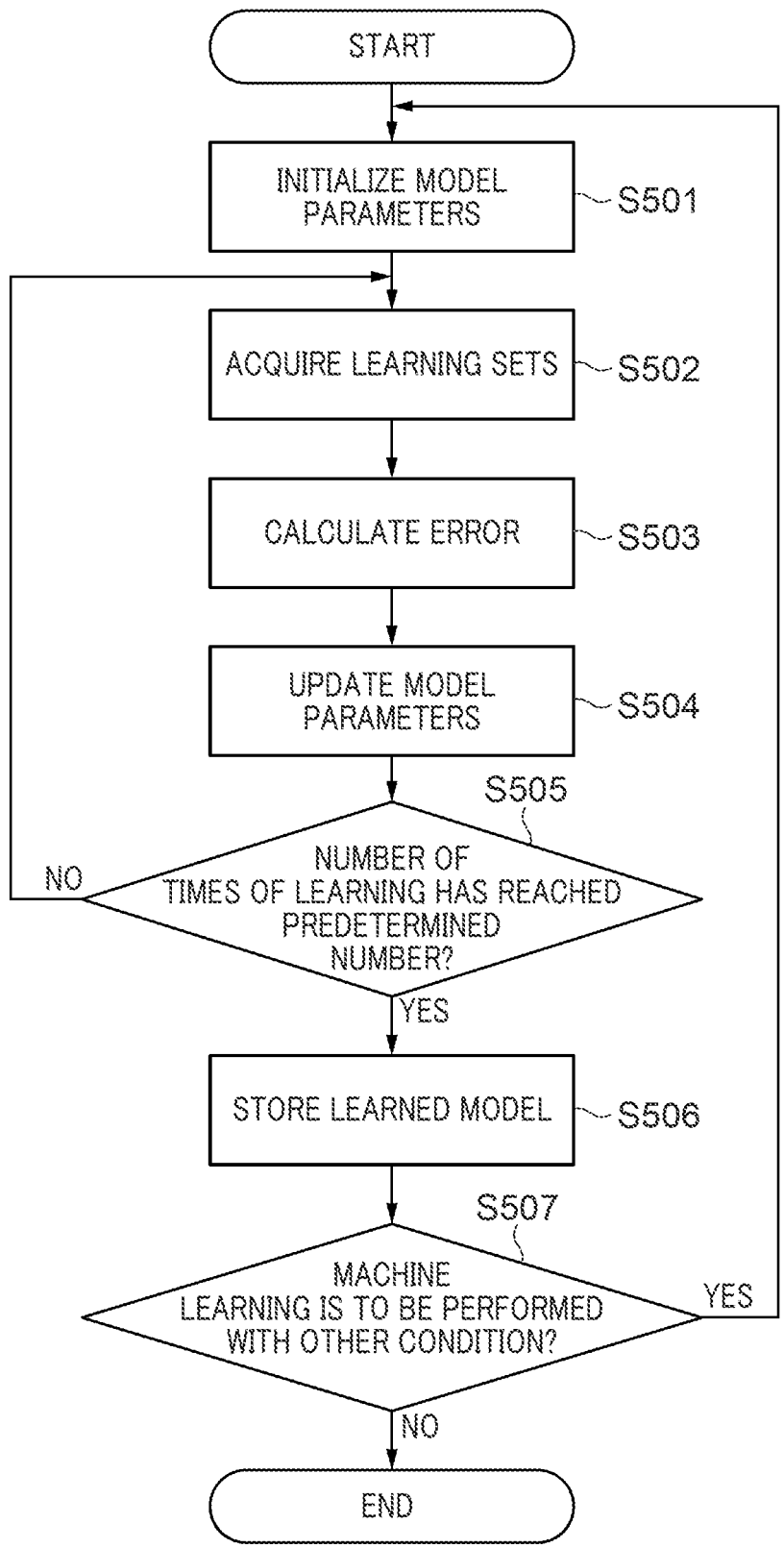
FIG. 5 is a flowchart of a learning process.

Next, the learning process will be described. FIG. 5 is a flowchart of the learning process. The learning process in FIG. 5 corresponds to the steps S302 and S322 in FIG. 3. Hereafter, the description is given assuming that the learning model is a neural network. In a step S501, the CPU 231 initializes values of weighting parameters in each of layers of the neural network, which are set in the GPU 239. In doing this, the CPU 231 may set the weighting parameters of the neural network to respective random values or initial values, or may load values learned last time and set the loaded values to the weighting parameters, respectively, again.

In a step S502, the CPU 231 acquires a plurality of learning sets. In doing this, the CPU 231 acquires a plurality of learning sets (pairs each of an image for learning and a correct answer image) which satisfy a data format condition, out of the plurality of learning sets acquired in the step S301 or S321. The data format condition includes, for example, at least one or more of the resolution, the gradation, and the compression method (including different compression rates). The CPU 231 may acquire a plurality of learning sets which satisfy all of the conditions of the resolution, the gradation, and the compression method, out of the plurality of learning sets acquired in the step S301 or S321. Further, the CPU 231 acquires a plurality of learning sets which further satisfy a predetermined character type condition, out of the plurality of learning sets satisfying the data format condition. The character types include digits, symbols, alphabetical letters, Chinese character letters, and so forth. Further, as the character type condition, typeface information (Gothic type, Ming type, or the like) and a font type may be added.

The character type condition is formed, in one case, by one character type or, in another case, by a plurality of character types. For example, in a case where the character type is formed only by digits, the characters are, for example, "01234". Further, in a case where the character type is formed by digits and symbols, the characters are, for example, "012-3456". The character type condition of character information indicating an amount of money is formed by digits and symbols ("¥" and ","), such as "¥10,000". Further, the character type condition of character information indicating a date of the Japanese calendar is formed by Chinese character letters and digits. Furthermore, the character type condition of character information indicating an address, a name, a telephone number, an office name, an item number, or the like is a condition of being formed by only one character type or a condition of being formed by a plurality of character types.

For example, when acquiring learning sets satisfying the character type condition for the Japanese amount of money, the CPU 231 acquires a plurality of learning sets which satisfy a condition of being formed by digits and Japanese money amount-representing Chinese character letters, as the character type condition, out of the plurality of learning sets. Further, when acquiring learning sets satisfying the character type condition of a character type formed only by digits, such as an order form number, the CPU 231 acquires a plurality of learning sets which satisfy a condition of being formed only by digits as the character type condition, out of the plurality of learning sets.

In a step S503, the CPU 231 inputs an image for learning (degraded image) of each learning set to the neural network and causes the GPU 239 to calculate an error between the image for learning and a correct answer image associated therewith, using the correct answer image as the teacher data. In a step S504, the CPU 231 updates the weighting parameter of each layer of the neural network by causing the GPU 239 to execute computation by backpropagation. By executing computation by backpropagation, the error calculated in the step S503 is minimized. In doing this, the GPU 239 updates the weighting parameters (such as weights and biases) applied to the nodes of each layer of the neural network such that an output image becomes close to the correct answer image when each image for learning is input to the neural network.

In a step S505, the CPU 231 determines whether or not the number of times of learning of the neural network has reached a predetermined number. Although the predetermined number of times can be set as desired, it is preferable to set the predetermined number to a number sufficient for learning of the neural network. If the answer to the question of the step S505 is negative (No), the CPU 231 returns to the step S502 to repeatedly execute the steps S502 to S504 until the number of times of learning reaches the predetermined number. When the number of times of learning reaches the predetermined number, the CPU 231 determines that the answer to the question of the step S505 is affirmative (Yes), and proceeds to a step S506. In the step S506, the CPU 231 stores the learning model in which the weighting parameters updated by the GPU 239 are set, in the storage 235 and/or the like.

The learning model in which the updated weighting parameters are set is a learned model. When an unknown degraded image is input, the learned model outputs an image close to an original image before the unknown degraded image is degraded. That is, the learned model functions as an image processing unit configured to restore a degraded image. For example, the learned model performs image restoration for eliminating isolated points in an image, which are generated by reading noise during scanning of the image. Further, the learned model performs image restoration for smoothing edge portions in a drawing object in the image, by suppressing irregularities, generated by resolution reduction or binarization, of the edge portions.

As described above, in the step S502, the learning sets satisfying the data format condition and the character type condition are acquired. In a step S507, the learning apparatus 102 determines whether or not to perform machine learning of the learning data with a different data format condition or a different character type condition. If the answer to the question of the step S507 is affirmative (Yes), the CPU 231 returns to the step S501, and performs control for executing machine learning of another learning model with a different condition. On the other hand, if the answer to the question of the step S507 is negative (No), the CPU 231 terminates the process in FIG. 5.

The determination processing in the step S507 will be described. For example, let it be assumed that the learning sets acquired in the step S301 in FIG. 3A or the step S321 in FIG. 3B include a plurality of learning sets generated under the different resolution conditions, as the learning sets of the plurality of data formats. For example, let it be assumed that three types of learning sets, generated at "600×600 dpi", "300×300 dpi", and "200×100 dpi", are acquired. In this case, in the step S507, if the three types of learning sets include a learning set which has not been used for machine learning yet, the CPU 231 determines that the answer to the question of the step S507 is affirmative (Yes). Further, let it be assumed that the learning sets acquired in the step S301 or S321 include a plurality of learning sets generated under the different gradation conditions as the learning sets of the plurality of data formats. For example, let it be assumed that three types of learning sets, generated at 16-bit gradation (=65536 colors), 8-bit gradation (=256 colors), and 1-bit gradation (=2 colors), are acquired. In this case, in the step S507, if the three types of learning sets include a learning set which has not been used for machine learning yet, the CPU 231 determines that the answer to the question of the step S507 is affirmative (Yes).

Further, let it be assumed that the plurality of acquired learning sets include a plurality of character type conditions. For example, a character type condition assumed to appear in a character image expressing a Japanese amount of money is a condition of being formed by digits ("0", "1", "2", . . . , "9") and some symbols (such as "¥", ",", and "-").

Further, a character type condition assumed to appear in a character image expressing a date is a condition of being formed by digits and some Chinese character letters (Chinese character letters expressing year, month, day, and each of a set of letters expressing the name of a Japanese era"). Similarly, character type conditions assumed to appear in character images of the target items, such as an address, a name, a telephone number, an office name, and an item number, are different. The CPU 231 controls the GPU 269 to perform machine learning of a learning model using the learning sets of all of the different character type conditions to generate learned models adapted to the respective conditions. Therefore, the plurality of learned models are generated according to all of the data format conditions and all of the character type conditions, respectively.

Figure 6:
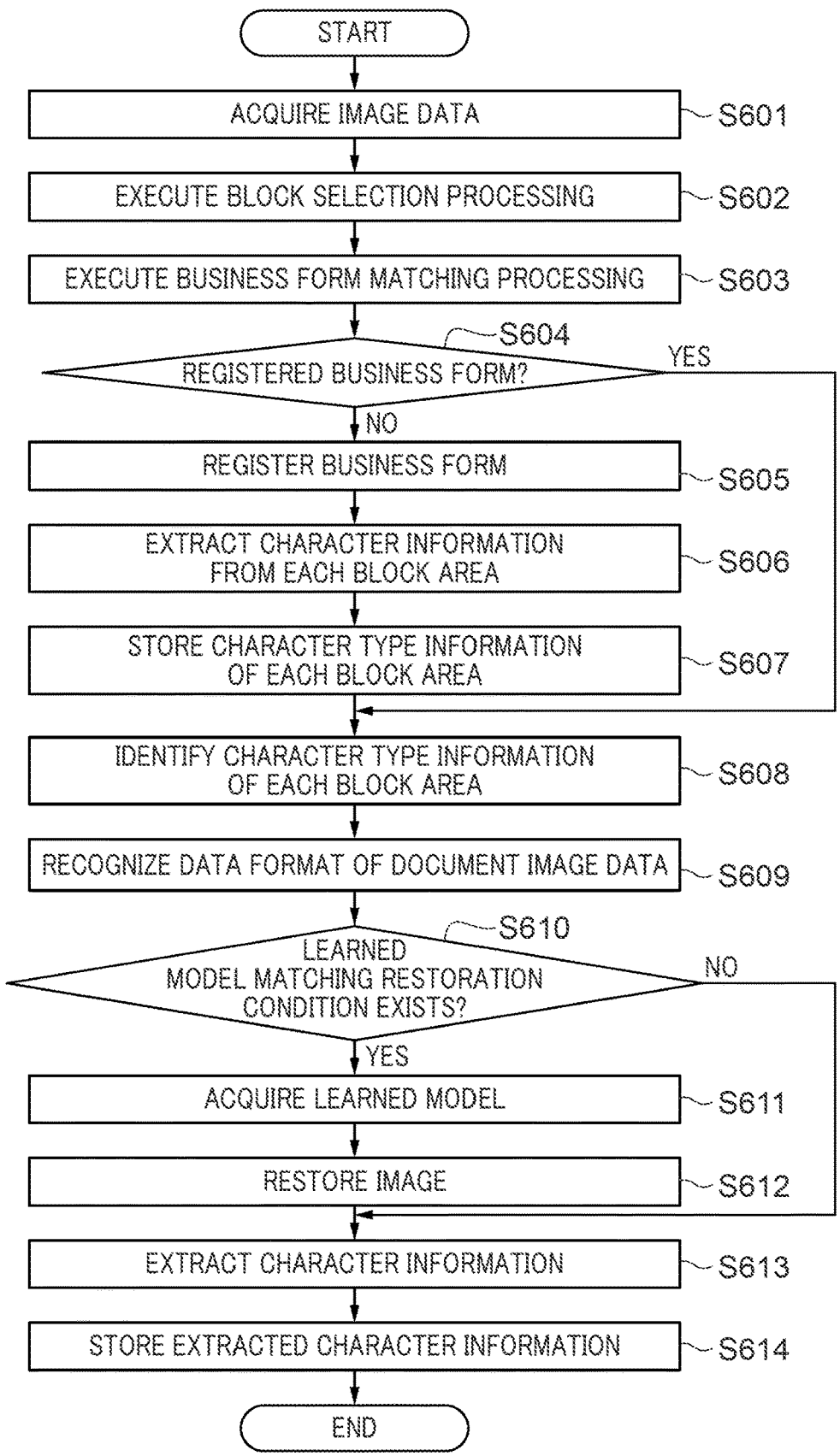
FIG. 6 is a flowchart of an image processing process.

Next, an example of a flow of image processing performed by the image processing server 103 will be described. FIG. 6 is a flowchart of an image processing process. The flowchart in FIG. 6 corresponds to the image processing in the step S306 FIG. 3A and the step S326 in FIG. 3B. As described above, the image processing server 103 receives image data (scanned data or FAX data) from the image forming apparatus 101. The image data is a degraded image as an inference target. In a step S601, the CPU 261 acquires an image data item.

In a step S602, the CPU 261 executes block selection (BS) processing. The block selection processing is processing for determining attributes, such as characters, pictures, and charts, and dividing the image data item into block areas each having a different attribute. A desired area determination technique can be applied to the block selection processing. Hereafter, a block determined as a character area by the block selection processing is referred to as a block area.

In a step S603, the CPU 261 executes business form matching processing. The business form matching processing is processing for calculating a similarity between the image data item acquired in the step S601 and a registered business form group stored e.g. in the storage 265 and extracting a registered business form having a maximum similarity. A desired business form recognition technique can be applied to the business form matching processing. The registered business form group is a group of image data items processed in the past and registered in a step S605, described hereinafter. The registered business form group may not be a group of of document image data items themselves, but a group of feature amounts that can be used for the business form matching processing, such as processing results of block selection performed on each document image data item. In the step S603, if a value of the similarity of a registered business form having the maximum similarity is not smaller than a predetermined threshold value, the CPU 261 extracts the registered business form, whereas if not, the CPU 261 extracts no registered business form.

In a step S604, the CPU 261 determines whether or not a registered business form has been extracted as a result of the business form matching processing in the step S603. If a registered business form has been extracted by the business form matching processing, the CPU 261 determines that the answer to the question of the step S604 is affirmative (Yes), and proceeds to a step S608. On the other hand, if no registered business form has been extracted by the business form matching processing, the CPU 261 determines that the answer to the question of the step S604 is negative (No), and proceeds to the step S605.

In the step S605, the CPU 261 executes form registration processing for adding the image data item acquired in the step S601 to the registered business form group used in the business form matching processing in the step S603. In a step S606, the CPU 261 executes the OCR processing on the block areas of the image data item acquired in the step S601, each determined as the character area in the step S602, to extract character information. In a step S607, the CPU 261 stores the character type information, as the attribute information, on a block basis, based on the character information extracted by the OCR processing. For example, let it be assumed that as a result of the OCR processing on a block area, the character information of the block area is formed by digits and some symbols used for the indication of an amount of money. In this case, the CPU 261 determines, based on the extracted character information, that the attribute information of the block area is the amount of money and determines that the character type information is formed by digits and some symbols used for the indication of an amount of money.

Further, let it be assumed that as a result of the OCR processing on a block area, the character information of the block area is formed by digits and some Chinese character letters expressing a date. In this case, the CPU 261 determines, based on the extracted character information, that the attribute information of the block area is the "date" and the character type information includes digits and some Chinese character letters used for expressing a date (Chinese character letters expressing year, month, day, and each of a set of letters expressing the name of a Japanese era). The above-described determination results (the character type information and the attribute information) are stored in a state associated with the registered business form added to the registered business form group in the step S605, e.g. in the storage 265. Similarly, character type information assumed to appear in items, such as an address, a name, a telephone number, an office name, and an order form number, and attribute information are stored in a state associated with the registered business form added to the registered business form group in the step S605, e.g. in the storage 265.

If it is determined that the character information obtained by performing the OCR processing on the block area corresponds to none of the attributes, CPU 261 stores the attribute information as "no correspondence" e.g. in the storage 265. The attribute information and the character type information stored in a state associated with the registered business form on a block area basis may be editable by a user using e.g. the input device 266.

In the step S608, the CPU 261 identifies the character type information of each block area, stored e.g. in the storage 265. In a step S609, the CPU 261 recognizes information of the data format (such as resolution, gradation, and compression method) of the image data item acquired in the step S601. In a step S610, the CPU 261 determines whether or not a learned model matching restoration conditions is stored in the storage 265. As described with reference to FIG. 5, the learning apparatus 102 performs machine learning of the learning model with respect to each of the plurality of data format conditions and the plurality of character type conditions. Then, a plurality of learned models adapted to the plurality of data format conditions and the plurality of character type conditions are generated. The plurality of generated learned models are stored in the storage 265.

Therefore, the plurality of learned models stored in the storage 265 have been subjected to learning adapted to different data formats and character type conditions. For this reason, to infer an output image close to the original image from the degraded image, a learned model of which the data format and the character type condition of learning matches the data format and character type information of the image data acquired in the step S601 is required to be used. Therefore, the CPU 261 performs the determination in the step S610. Whether or not the learned model matches in the character type condition of the restoration conditions is determined based on whether or not the learned model has been learned using a learning set including all character types used in the block areas.

Here, the restoration condition may be only the character type condition. Even when a learned model not taking the data format condition into account is used, by inferring the original image using a learned model adapted to the character type condition, it is possible to restore the character information included in the block area with high accuracy. In this case, in the learning, machine learning of a learning model by taking the data format condition into account is not performed.

If the answer to the question of the step S610 is negative (No), the CPU 261 proceeds to a step S613. On the other hand, if the answer to the question of the step S610 is affirmative (Yes), the CPU 261 proceeds to a step S611. In the step S611, the CPU 261 acquires a learned model matching the restoration conditions, out of the plurality of learned models stored in the storage 265.

In a step S612, the CPU 261 performs image processing for restoring the degraded image using the acquired learned model. The CPU 261 inputs the image of the block area of the image data item (degraded image) acquired in the step S601 to the acquired learned model. At this time, the CPU 261 causes the GPU 269 to execute computation for inference using the image of the block area of the degraded image as an input to the learned model. An image generated by restoring the image of the block area (restored image) is obtained from the learned model as an inference result. In a case where a plurality of block areas are included in the image data, a plurality of restored images generated by restoring the images of the respective block areas are obtained. The restored image output from the learned model is an image close to the image of the block area of the original image. Particularly, in a case where the inference accuracy of the learned model is high, the restored image becomes an image that has almost reproduced the image of the block area of the original image.

In the step S613, the CPU 261 executes OCR processing on the restored image or the degraded image with respect to each block area and extracts character information (text data) from the block area of the image data. In a step S614, the extracted character information is stored in the storage 265 in a state associated with the block area of the image data.

Here, learning and inference will be described. FIGS. 7A and 7B are diagrams showing samples of learning and inference. FIG. 7A is a diagram showing samples of a learning set used when the learning apparatus 102 performs learning. In sample 1 and sample 2, a Chinese character letter expressing "electricity" and a Chinese character letter expressing "surprise" are illustrated as correct answer images having high quality. Input images (images for learning) are images generated by degrading the correct answer images, and hence, missing, deformation, etc., have occurred in each of the characters of the correct answer images. In learning, the weighting parameters of the neural network are updated such that the input images become close to the correct answer images.

FIG. 7B is a diagram showing samples of degraded images as inference targets and restored images. The character indicated by the original image of the degraded image of sample 1 is a Chinese character letter expressing "source". The degraded image is degraded due to missing, deformation, etc., caused e.g. by FAX transmission, and is difficult to be identified. Therefore, in a case where OCR processing is performed on the degraded image, the character is recognized as a Chinese character letter expressing "waterfall" which is different from the character indicated by the original image. On the other hand, in the present embodiment, the degraded image is input to the learned model, and the restored image of sample 1 is output as a result of inference performed by the learned model. The character indicated by the restored image is easier to be properly recognized than the character indicated by the degraded image. In a case where OCR processing is performed on the restored image, the character is recognized as the Chinese character letter expressing "source" which is the same as the character represented by the original image.

The same is applied to sample 2. In sample 2, the original image "D" has been degraded to an image (degraded image) similar to "O". The character indicated by the degraded image is degraded due to occurrence of missing, deformation, etc., and is difficult to be recognized. Therefore, in a case where the OCR processing is performed on the degraded image, as a result of the character recognition, a recognition result "O" is obtained, which is different from the original image "D". On the other hand, the restored image is restored from the degraded image by inference performed by the learned model, and in a case where the OCR processing is performed on the restored image, the character is recognized as "D" which is the same as the character indicated by the original image. Therefore, by inferring a restored image from a degraded image using a learned model, it is possible to prevent a character from being erroneously recognized by the OCR processing.

As the OCR processing, if a business form extracted by the business form matching processing is a printed-character business form, printed-character OCR processing can be applied, and if an extracted business form is a handwritten-character business form, handwritten-character OCR processing can be applied. That is, the CPU 261 may execute OCR processing by appropriately selecting a processing module e.g. for the printed-character OCR processing or the handwritten-character OCR processing according to a business form extracted by the business form matching processing.

Next, image restoration and information extraction performed by taking the character type condition into account on a block area basis will be described. FIG. 8 is a view showing an example of an image of a business form. A business form 800 shown in FIG. 8 includes a plurality of items 801 to 810. The item 801 indicates an issue date. The item 804 indicates an order form number. The item 810 indicates a total of amounts of money. For example, in a case where OCR processing is performed on the business form 800, character information recognized using the character information items of the items 801, 804, and 810, as input items, is stored in the storage 265.

Figure 9C:
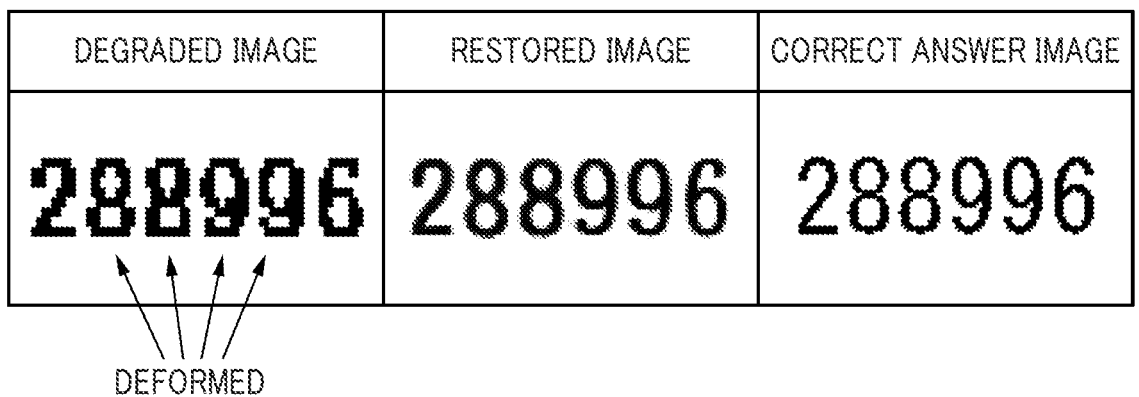

FIGS. 9A to 9C are diagrams each showing an example of a degraded image, a restored image, and a correct answer image. The illustrated examples in FIGS. 9A to 9C are examples in a case where image restoration adapted to the character type "digit" is applied to such a block area as exemplified by the order form number of the above item 804. The degraded image appearing in FIG. 9A is degraded in image quality e.g. by FAX transmission. Let it be assumed that "FIG3" appears in the original image corresponding to the degraded image. This character image is an image of characters of a character type formed by alphabetical letters and digits. If general-purpose image restoration is applied to the degraded image appearing in FIG. 9A, part of "G" in the degraded image may be restored to an image similar to "6". Assuming that the OCR processing is executed on this restored image, for example, "G" may be erroneously recognized as "6".

On the other hand, in the present embodiment, by applying inference performed using a learned model adapted to each character type and each typeface to a degraded image, the learned model outputs a restored image.

The illustrated example in FIG. 9B shows the character information whose original image of the block area corresponding to the item 804 is formed by the digits of "482404". The typeface of this character information is assumed to be Ming-style type. The degraded image has a missing in a line as a component of the character. When the OCR processing is executed on the degraded image, the character information may be incorrectly recognized. On the other hand, in the present invention, a restored image is generated by applying a learned model adapted to a character type (digits and Ming-style type) to a degraded image. Therefore, when the OCR processing is executed on the generated restored image, the character information is correctly recognized. The illustrated example in FIG. 9C shows character information whose original image is formed by the digits of "288996". Let it be assumed that the typeface of this character information is Gothic type. Deformation has occurred in the degraded image, but the restored image generated by applying a learned model adapted to the character type (digits and Gothic type) is reduced in degree of the deformation and becomes close to the correct answer image. Therefore, the character information can be correctly recognized from the restored image by performing the OCR processing.

As described above, a plurality of learned models subjected to machine learning using a lot of learning sets associated with the character type conditions and the data format conditions are stored in the image processing server 103. Then, the image processing server 103 inputs an image of a block area of a degraded image to a learned model adapted to the character type condition and the data format condition of the block area which is the inference target to obtain a restored image as an inference result. The degraded image is made closer to an image of character shapes having high likelihood, by inference performed using the learned model, and hence it is possible to acquire an image of characters close to the characters of the original image. Then, by executing OCR processing on the restored image, the accuracy of recognition of characters appearing in the original image is improved. With this, it is possible to store the correct character information in the image processing server 103 which functions as the business system.

For example, in a case where a form to be processed is scanned or transmitted by FAX, the image of the business form is degraded, and missing, deformation, etc., may occur in the characters of the image. At this time, as described above, the image processing server 103 obtains a restored image using a suitable learned model for each business form to be processed or each item of the form. Further, the image processing server 103 can extract character information with high accuracy by executing OCR processing on the restored image. That is, it is possible to extract character information with high accuracy, by restoring an image of a business form or an item as a processing target, which has degradation factors including resolution reduction and compression noise and is limited in character type, by using a learned model associated therewith, and then executing OCR processing on the restored image.

Although in the above-described first embodiment, the process for restoring character information is performed for each block area included in the image of the business form, a process for restoring character information included in the whole image of the business form may be performed. For example, in a case where the number of items included in the image of the business form is small (such as 1 or 2), the character information restoration process may be performed with respect to the whole image of the form. This point also applies to a second embodiment and a third embodiment, described hereafter.

Next, the second embodiment will be described. In the second embodiment, learning and inference are performed by further taking a character size condition into account as a restoration condition. In the first embodiment, in the step S507 in the process in FIG. 5, machine learning of the learning model using learning sets associated with the plurality of character type conditions and the plurality of data format conditions is performed. In the second embodiment, machine learning of the learning model is performed using learning sets not only associated with the plurality of character type conditions and the plurality of data format conditions, but also associated with a plurality of character size conditions. Therefore, a plurality of learned models adapted to the plurality of character type conditions, the plurality of data format conditions, and the plurality of character size conditions are generated.

It is assumed that in the second embodiment, the character size is expressed by the number of pixels. However, the character size may be expressed by a numerical value of e.g. points. For example, in a case where a character of 24 pt is printed on a business form at a resolution of 300 dpi, the information of 100 pixels can be acquired as the character size information. In the second embodiment, for example, the character size information is classified into two character size conditions, i.e. the number of pixels corresponding to larger character sizes (14 pt to 12 pt) and the number of pixels corresponding to smaller character sizes (8 pt to 12 pt). Then, machine learning of a learning model is performed using learning sets (images for learning and correct answer images associated therewith) of the numbers of pixels corresponding to the character size conditions. With this, learned models adapted to the plurality of character type conditions, the plurality of data format conditions, and the plurality of character size conditions are generated. Classification of the character size conditions is not limited to the above-described example.

Next, the image processing in the second embodiment will be described with reference to FIG. 6. In the step S608, the CPU 261 identifies the character type information for each block area and identifies the character size information for each block area. For example, let it be assumed that each of the characters of the items 801 to 804 out of the items 801 to 810 appearing in FIG. 8 has the number of pixels corresponding to a size of 16 pt. In this case, in the step S611, the CPU 261 acquires a learned model subjected to machine learning using learning sets associated with the larger character sizes. Then, in the step S612, the CPU 261 inputs a degraded image to the acquired learned model to acquire a restored image inferred by the learned model.

Let it be assumed that each of the characters of the items 805 to 810 out of the items 801 to 810 appearing in FIG. 8 has the number of pixels corresponding to a size of 10 pt. In this case, in the step S611, the CPU 261 acquires a learned model subjected to machine learning using learning sets associated with the smaller character sizes. Then, in the step S612, the CPU 261 inputs a degraded image to the acquired learned model to acquire a restored image inferred by the learned model. From the above, it is possible to perform restoration using the learned model by further taking the character size condition into account.

As described above, in the second embodiment, it is possible to perform restoration by applying a learned model matching in the character size condition, and hence it is possible to infer a restored image from a degraded image with higher accuracy. Further, when OCR processing is executed on the restored image, it is possible to extract character information with high accuracy.

Next, the third embodiment will be described. In the third embodiment, the restoration process and the OCR processing are performed only on limited one(s) of block areas included in a business form. In the third embodiment, in the image processing server 103, one or more block areas are designated as image restoration targets in advance. For example, high recognition accuracy is particularly required for digits and symbols used for collation with other database information, such as those for an amount of money (a unit price and a total amount), a telephone number, a commodity code, and an order form number, in a business form. Therefore, one or more block areas in the business form, which require the high recognition accuracy, are designated as the restoration target in advance. The items to be designated may be registered in the image processing server 103 by an order receiver using the input device 266.

For example, let it be assumed that in the illustrated example of the business form 800 in FIG. 8, the block areas corresponding to the items 804, 805, and 807 which are expressed by the character type condition of being formed only by digits are designated as the restoration targets. In this case, the CPU 261 determines that the answer to the question of the step S610 in FIG. 6 is affirmative (Yes) with respect to the items 804, 805, and 807, and executes the steps S611 and S612. On the other hand, the CPU 261 determines that the answer to the question of the step S610 is negative (No) with respect to the items other than the items 804, 805, and 807 and does not execute the steps S611 and S612.

Further, in the illustrated example of the business form 800 in FIG. 8, let it be assumed that the block areas corresponding to the items 804, 805, and 807 to 810 expressed by the character type condition of being formed by digits and some symbols are designated as the restoration targets. In this case, the CPU 261 determines that the answer to the question of the step S610 in FIG. 6 is affirmative (Yes) with respect to the items 804, 805, and 807 to 810 and executes the steps S611 and S612. On the other hand, the CPU 261 determines that the answer to the question of the step S610 is negative (No) with respect to the items other than the items 804, 805, and 807 to 810 and does not execute the steps S611 and S612.

As described above, in the third embodiment, the restoration process and the OCR processing are performed only on the block areas corresponding to the items designated in advance. The restoration process is realized by inference performed using the learned model. The learned model performs a huge amount of computation for inference. By limiting the block areas as the restoration targets, as in the third embodiment, the computation amount is reduced. As a result, time required to perform image processing can be reduced. Further, for a block area corresponding to an item requiring high accuracy in character recognition, the restoration process using a learned model is performed, and hence it is possible to maintain the high recognition accuracy by adding necessary minimum processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-203561, filed Dec. 8, 2020, which is hereby incorporated by reference herein in its entirety.

What is claimed is:

1. An image processing apparatus, comprising:
at least one processor; and
at least one memory coupled to the at least one processor, the at least one memory storing instructions, wherein the at least one processor executes the instructions to perform:
   acquiring image data of a page, the image data including a plurality of blocks of character information in the page;
   identifying a character type of the character information for each respective block of the plurality of blocks, the character type corresponding to a defined combination of characters present in the each respective block;
   acquiring a respective learned model adapted to the identified character type for the each respective block from a plurality of learned models, wherein the plurality of learned models are obtained by performing machine learning using degraded images for learning, which are associated with a plurality of character type conditions, respectively, and correct answer images associated therewith, and wherein each respective learned model of the plurality of learned models is trained using a subset of the degraded images as input to the learned model and a corresponding subset of the correct answer images as expected output from the learned model, the each respective learned model corresponding to each respective character type condition of the plurality of character type conditions and being adapted to restore degraded blocks of that respective character type condition;

inputting respective images of character information of the each respective block of character information, from the acquired image data of the page, to the acquired respective learned model to restore degraded portions of the respective images of character information of the each respective block of character information in the acquired image of the page; and generating a restored image of the page, based on the restored degraded portions of the respective images of character information of the each respective block of character information in the acquired image of the page, in order to recognize the character information.

2. The image processing apparatus according to claim 1, wherein the at least one processor executes the instructions to further perform optical character recognition processing on the restored image of the page to recognize the character information.

3. The image processing apparatus according to claim 1, wherein the image data is image data read by a scanner or image data transmitted by facsimile.

4. The image processing apparatus according to claim 1, wherein the least one processor executes the instructions to further perform inputting respective images of character information of the plurality of block areas included in the image data to restore the respective images of character information of the plurality of block areas.

5. The image processing apparatus according to claim 4, wherein the character type of the image of character information of the block area is identified by optical character recognition processing.

6. The image processing apparatus according to claim 4, wherein the image data is image data of a business form, and
wherein the block area refers to one or more items included in the business form.

7. The image processing apparatus according to claim 4, wherein the at least one processor performs processing for restoring the image of the page with respect to one or more first block areas, out of the plurality of block areas, for which a character type has been registered, and does not perform processing for restoring the image of the page with respect to one or more second block areas for which no character type has been registered.

8. The image processing apparatus according to claim 4, wherein the at least one processor performs processing for restoring the image of the page with respect to designated ones of the plurality of block areas, and does not perform processing for restoring the image of character information with respect to non-designated ones of the plurality of block areas.

9. An image processing method, comprising:
acquiring image data of a page, the image data including a plurality of blocks of character information in the page;
identifying a character type of the character information for each respective block of the plurality of blocks, the character type corresponding to a defined combination of characters present in the each respective block;
acquiring a respective learned model adapted to the identified character type for the each respective block from a plurality of learned models, wherein the plurality of learned models are obtained by performing machine learning using degraded images for learning, which are associated with a plurality of character type conditions, respectively, and correct answer images associated therewith, and wherein each respective learned model of the plurality of learned models is trained using a subset of the degraded images as input to the learned model and a corresponding subset of the correct answer images as expected output from the learned model, the each respective learned model corresponding to each respective character type condition of the plurality of character type conditions and being adapted to restore degraded blocks of that respective character type condition;

inputting respective images of character information of the each respective block of character information, from the acquired image data of the page, to the acquired respective learned model to restore degraded portions of the respective images of character information of the each respective block of character information in the acquired image of the page; and generating a restored image of the page, based on the restored degraded portions of the respective images of character information of the each respective block of character information in the acquired image of the page, in order to recognize the character information.

10. A non-transitory computer-readable storage medium storing a program for causing a computer to execute an image processing method, wherein the method comprises:
acquiring image data of a page, the image data including a plurality of blocks of character information in the page;
identifying a character type of the character information for each respective block of the plurality of blocks, the character type corresponding to a defined combination of characters present in the each respective block;
acquiring a respective learned model adapted to the identified character type for the each respective block from a plurality of learned models, wherein the plurality of learned models are obtained by performing machine learning using degraded images for learning, which are associated with a plurality of character type conditions, respectively, and correct answer images associated therewith, and wherein each respective learned model of the plurality of learned models is trained using a subset of the degraded images as input to the learned model and a corresponding subset of the correct answer images as expected output from the learned model, the each respective learned model corresponding to each respective character type condition of the plurality of character type conditions and being adapted to restore degraded blocks of that respective character type condition;

inputting respective images of character information of the each respective block of character information, from the acquired image data of the page, to the acquired respective learned model to restore degraded portions of the respective images of character information of the each respective block of character information in the acquired image of the page; and generating a restored image of the page, based on the restored degraded portions of the respective images of character information of the each respective block of character information in the acquired image of the page, in order to recognize the character information.

* * * * *